(12) United States Patent
Chou et al.

(10) Patent No.: US 8,054,374 B2
(45) Date of Patent: Nov. 8, 2011

(54) IMAGE BRIGHTNESS CORRECTION METHOD

(75) Inventors: Chan-Min Chou, Taipei (TW); Chung-Pin Lu, Taipei (TW)

(73) Assignee: Altek Corporation, Hsinchu (TW)

( * ) Notice: Subject to any disclaimer, the term of this patent is extended or adjusted under 35 U.S.C. 154(b) by 481 days.

(21) Appl. No.: 12/328,861

(22) Filed: Dec. 5, 2008

(65) Prior Publication Data

US 2010/0073552 A1 Mar. 25, 2010

(30) Foreign Application Priority Data

Sep. 19, 2008 (TW) .............................. 97136085 A

(51) Int. Cl.
G03B 7/00 (2006.01)
H04N 5/235 (2006.01)
H04N 5/222 (2006.01)
H04N 9/73 (2006.01)
G06K 9/40 (2006.01)
G06K 9/00 (2006.01)

(52) U.S. Cl. ..................... 348/362; 348/229.1; 348/371; 348/221.1; 348/223.1; 382/274; 382/167

(58) Field of Classification Search ............... 348/222.1, 348/229.1, 370, 371, 296, 333.05, 333.11, 348/365, 362, 687, 67, 3; 382/274, 167, 382/300

See application file for complete search history.

(56) References Cited

U.S. PATENT DOCUMENTS

| 2002/0150306 A1* | 10/2002 | Baron | 382/275 |
| 2007/0189752 A1* | 8/2007 | Kobayashi | 396/157 |
| 2008/0252749 A1* | 10/2008 | Fujiwara | 348/224.1 |

* cited by examiner

*Primary Examiner* — Jason Chan
*Assistant Examiner* — Stephen Coleman
(74) *Attorney, Agent, or Firm* — Rabin & Berdo, P.C.

(57) ABSTRACT

An image brightness correction method is described. First, a pre-flash is fired and a pre-flash image is shot. After a main flash duration is estimated according to the pre-flash image and an automatic exposure time of a camera device, a main flash is fired and a raw image is shot. Then, a brightness gain of the raw image is compensated according to a preset gain threshold, and a digital brightness gain of the image is adjusted to enable the image shot each time to achieve the same brightness gain.

5 Claims, 3 Drawing Sheets

| Data No. | Wide-angle distance | | | | | |
|---|---|---|---|---|---|---|
| | 0.3 M | 0.5 M | 1 M | 2 M | 3 M | 4 M |
| 1 | 173.23 | 157.25 | 149.69 | 154.58 | 150.63 | 152.71 |
| 2 | 147.34 | 152.12 | 149.28 | 149.32 | 149.60 | 145.78 |
| 3 | 173.35 | 148.35 | 149.03 | 145.22 | 150.80 | 152.09 |
| 4 | 145.24 | 144.67 | 144.70 | 148.28 | 152.29 | 147.34 |
| 5 | 131.51 | 154.46 | 144.56 | 142.49 | 149.37 | 147.57 |

IMAGE BRIGHTNESS CORRECTION METHOD

CROSS-REFERENCE TO RELATED APPLICATIONS

This non-provisional application claims priority under 35 U.S.C. §119(a) on Patent Application No(s). 097136085 filed in Taiwan, R.O.C. on Sep. 19, 2008 the entire contents of which are hereby incorporated by reference.

BACKGROUND OF THE INVENTION

1. Field of the Invention

The present invention relates to an image processing method, and more particularly to an image brightness correction method for adjusting an image to obtain a consistent brightness gain value.

2. Related Art

As camera devices having been increasingly prevailing, they are more and more widely used in various applications. When a camera device is used for shooting an image, the shooting brightness may directly affect the quality and recognizability of the final image. Especially, when the light in the shooting site is inadequate or the exposure time fails to meet the requirement of the safety shutter, a flash lamp is required to compensate the brightness of the shooting environment. Therefore, the brightness of the shot image is compensated by the flash lamp, such that the shot image may not have any unrecognizable area due to the excessively inadequate brightness.

FIG. 1A is a flow chart of a conventional camera device employing a flash lamp to shoot an image. Referring to FIG. 1A, a method for shooting an image by a conventional camera device employing a flash lamp includes the following steps. First, a pre-flash is fired and a pre-flash image is shot (Step S110). An automatic exposure time of the camera device is captured (Step S120). A main flash duration is estimated according to the pre-flash image and the automatic exposure time (Step S130). Then, a main flash is fired according to the main flash duration, and a raw image is shot (Step S140). Finally, an image processing is performed on the raw image, so as to output a preset image file (Step S150). Through the above steps, when capturing an image, the camera device can determine the occasion when a flash lamp is needed for image shooting.

However, the flash lamp of the camera device works at a different level each time. The stability of the flash lamp depends on a capacitance of the flash lamp, and the smaller the capacitance of the flash lamp is, the poorer its discharge stability will be. When the discharge stability is undesirable, the brightness of the image that is shot each time is not uniform. For example, FIG. 1B is a data diagram showing brightness gain values of a conventional camera device when shooting an image through using a flash lamp. Referring to FIG. 1B, the experimental data are brightness gain values of images shot at the same scene and brightness but with different object distances. For example, when the images are shot at 0.3 m, the brightness gain values of images shot in several experiments have a difference of about 30%, that is, (173.35− 131.51)/154.134, Though it is possible to compensate the brightness gain value difference of the image shot each time by replacing a flash lamp with a higher stability, the unit prices of components in the flash lamp with a higher stability are much higher, and it still cannot guarantee that the image shot each time achieves the same brightness gain value. In other words, the techniques in the prior art cannot overcome the problem that the output images have non-uniform brightness due to inconsistent flash levels of the flash lamp.

SUMMARY OF THE INVENTION

In view of the above problem that the shot images have non-uniform brightness gain values due to the instability of the flash lamp, the present invention is directed to an image brightness correction method, which is suitable for compensating a brightness gain value of a raw image to the same level, thereby outputting images with a uniform brightness gain value.

In order to achieve the above objective, an image brightness correction method is provided in the present invention, which is performed by a camera device, so as to output shot images with a uniform brightness gain value. In the method, first, a pre-flash is fired and a pre-flash image is shot. An automatic exposure time of the camera device is captured, and a main flash duration is estimated according to the pre-flash image and the automatic exposure time of the camera device. Then, a main flash is fired according to the main flash duration, and a raw image is shot. A brightness gain value of the raw image is calculated, and an inadequate brightness gain value ratio of the raw image is calculated according to a preset gain threshold value. Finally, according to the inadequate brightness gain value ratio of the raw image, a color gain value of the raw image is recalculated, and the compensated color gain value is output as a preset image file.

Through the above steps, the image brightness correction method of the present invention corrects different brightness gain values into the preset gain threshold under the same scene and brightness. Besides, the original brightness gain value is replaced by the preset gain threshold value, so as to perform an image processing on the raw image, such that the output preset image file achieves a uniform brightness. In addition, the brightness gain value of the raw image is corrected to compensate the brightness gain value affected by the instability of the flash lamp, so as to maintain the uniform brightness of the preset image files.

BRIEF DESCRIPTION OF THE DRAWINGS

The present invention will become more fully understood from the detailed description given herein below for illustration only, and thus is not limitative of the present invention, and wherein.

DETAILED DESCRIPTION OF THE INVENTION

The objective and method of the present invention are described in detail below through preferred embodiments, and the concept of the present invention may also be applied to other scopes. The following embodiments are only intended to illustrate the objective and method of the present invention, instead of limiting the scope of the present invention.

Figures 1A, 1B:
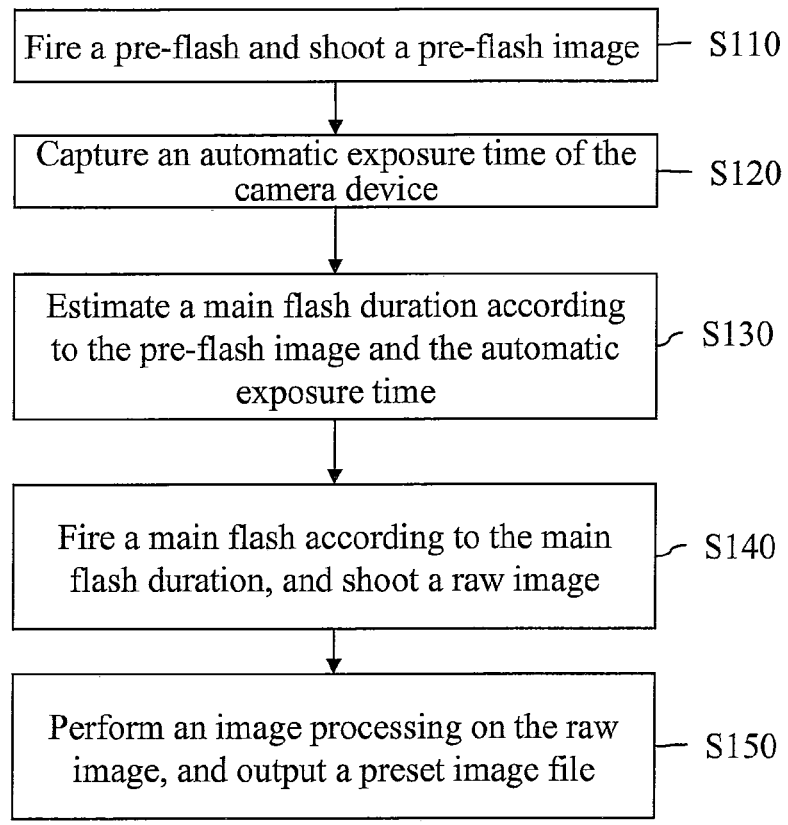
FIG. 1A is a flow chart of a conventional camera device when shooting an image through using a flash lamp.
FIG. 1B is a data diagram showing brightness gain values of a conventional camera device when shooting an image through using a flash lamp.
Figure 2:
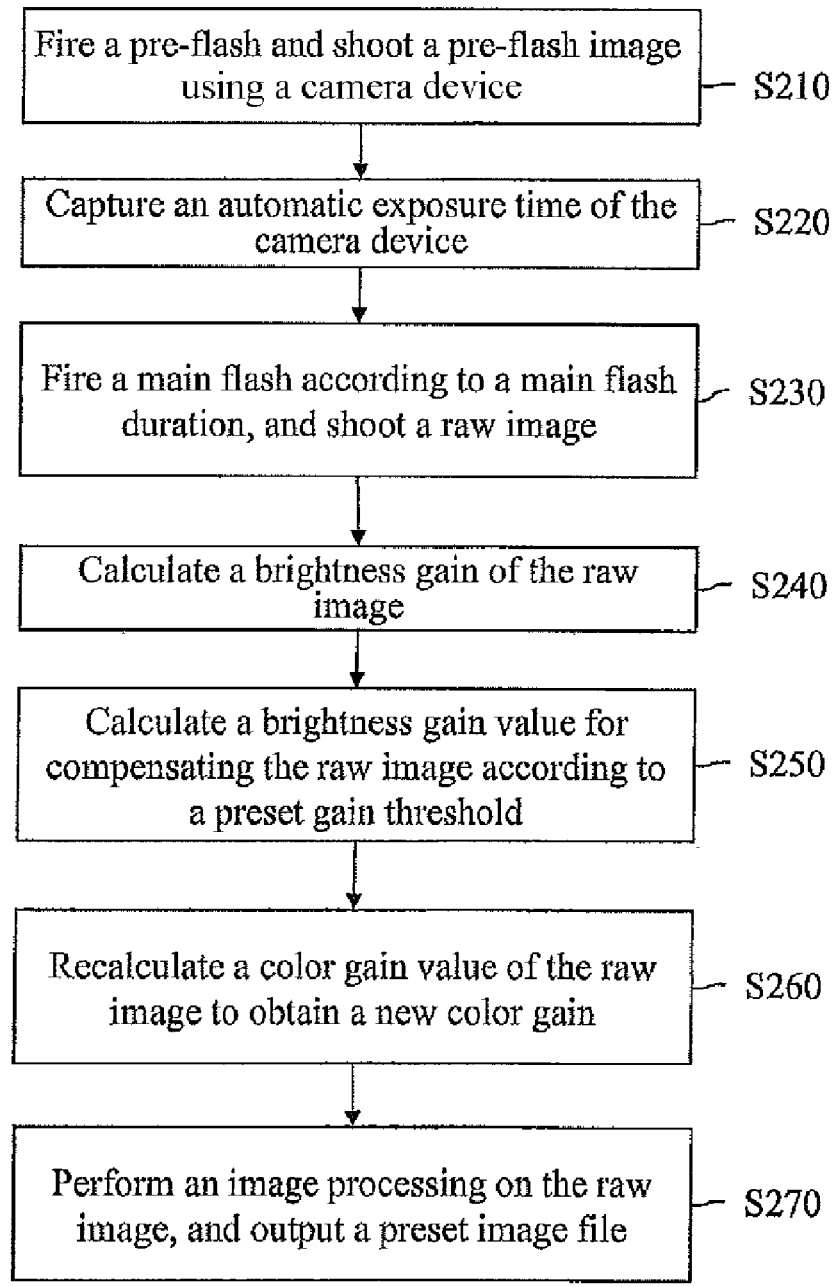
FIG. 2 is a flow chart of an image brightness correction method.

FIG. 2 is a flow chart of an image brightness correction method. Referring to FIG. 2, in the method of this embodiment, a brightness gain value of a shot raw image is compared with a preset gain threshold value to obtain a brightness gain value for compensating the raw image. Then, a color gain value of the raw image is recalculated according to the brightness gain value for compensating the raw image (i.e., an inadequate brightness gain ratio). The inadequate brightness gain value ratio is denoted by the following mathematical expression:

the inadequate brightness gain value ratio of the raw image=the preset gain threshold value/the brightness gain of the raw image.

Next, the brightness gain value and color gain value of the raw image are replaced by the compensated brightness gain value and color gain value. Therefore, under the same scene and brightness, shot images with distinct differences in brightness and color can output preset image files with a uniform brightness by means of adjusting the brightness gain value, thereby enhancing the brightness stability of the shot image.

The image brightness correction method includes the following steps. First, a pre-flash is fired and a pre-flash image is shot (Step S210). The camera device shoots the pre-flash image before shooting a raw image, so as to estimate a parameter required by the raw image. As various camera devices shoot the pre-flash images for different times, when estimating the parameter required by the raw image, if there are pre-flash images shot more than once, an optimal parameter is selected from the pre-flash images. Then, an automatic exposure time of the camera device is captured, and a main flash duration is estimated according to the pre-flash image and the automatic exposure time of the camera device (Step S220). The main flash duration is a duration when the flash lamp is in an ON status when the raw image is shot. The time length of the duration when the flash lamp maintains the ON status may affect the photosensitivity of light-sensitive components in the camera device.

After setting the main flash duration, the camera device fires a main flash according to the main flash duration, and shoots a raw image (Step S230). Meanwhile, when shooting the raw image, the camera device also receives lights from the flash lamp and the scene, and converts the lights into brightness. Therefore, after shooting the raw image, the camera device calculates a brightness gain value of the raw image (Step S240). The process for calculating the brightness gain value of the raw image is to convert the luminosity captured when shooing the raw image into a current signal through a photoelectric effect. Then, the current signal is converted into a digital signal, and the brightness gain value of the raw image is calculated according to the digital signal. The process for calculating the brightness gain value of the raw image according to the digital signal is generally performed in a linear manner.

After calculating the brightness gain value of the raw image, the camera device calculates a brightness gain value for compensating the raw image according to a preset gain threshold value (Step S250). The preset gain threshold is a maximum brightness gain value selected from all the calculated brightness gain values of the images photographed according to the pre-flash shot each time. Alternatively, in order to establish a reference preset gain threshold value in different situations, a brightness gain database is created. The brightness gain database defines preset gain thresholds value corresponding to automatic exposure time, aperture size, focal distance, and main flash duration set when shooting an image. In this manner, a desired preset gain threshold value is retrieved according to the automatic exposure time, aperture size, focal distance, and main flash duration, so as to be compared with the brightness gain value of the raw image.

After obtaining the brightness gain value for compensating the raw image or the brightness gain value of the raw image to be decreased, the camera device recalculates a color gain value of the raw image, so as to obtain a new color gain value (Step S260). In fact, the inadequacy of the brightness gain value means the time duration for firing the main flash by the flash lamp during shooting is not long enough, and as a result, the received lights are insufficient. The time duration for firing the main flash by the flash lamp also affects the color gain value. When an inadequate color gain value is resulted from the incapability of the device to receive a correct spectrum, the preset image file output after image processing is in a dark color or in black.

As the color gain value is also affected by the lights received in shooting, when the brightness gain value of the raw image is adjusted to a preset gain threshold value 301, the color gain value thereof also needs to be changed. The process for calculating a new color gain value is to proportionally amplify the color gain value of the raw image according to the brightness gain value for compensating the raw image, or to compensate the color gain value of the raw image after proportionally converting the brightness gain value for compensating the raw image, or to obtain a new color gain value by performing an interpolation calculation on the brightness gain value for compensating the raw image and the color gain value of the raw image. The primary colors of the camera device are red, green, and blue. During the calculation of the new color gain value, individual new color gain values are respectively obtained according to red, green, and blue. Alternatively, the new color gain value is calculated from the color gain value of the raw image by matrix.

Finally, an image processing is performed on the raw image, and a preset image file is output (Step S270). In this step, the camera device performs the image processing through replacing the brightness gain value and color gain value of the raw image with the preset gain threshold value 301 and the new color gain value. During the image processing, all the primary colors (RGB) of the image are converted into colors linearly correlated with brightness (Linear RGB). The formula of converting the primary colors into colors linearly correlated with brightness is listed as follows:

Colors linearly correlated with brightness=color gain value*primary colors+brightness gain value.

Alternatively, red linearly correlated with brightness=red gain value*primary red+brightness gain value.

Green linearly correlated with brightness=green gain value*primary green+brightness gain value.

Blue linearly correlated with brightness=blue gain value*primary blue+brightness gain value.

The colors linearly correlated with brightness are displayed on the preset image file for recognition. Therefore, the preset gain threshold value 301 and the new color gain value are used to replace the brightness gain value and color gain value of the raw image, such that the colors linearly correlated with brightness can be adjusted into close colors according to the preset gain threshold value 301, thereby enabling the preset image file to maintain a stable brightness.

Figure 3A:
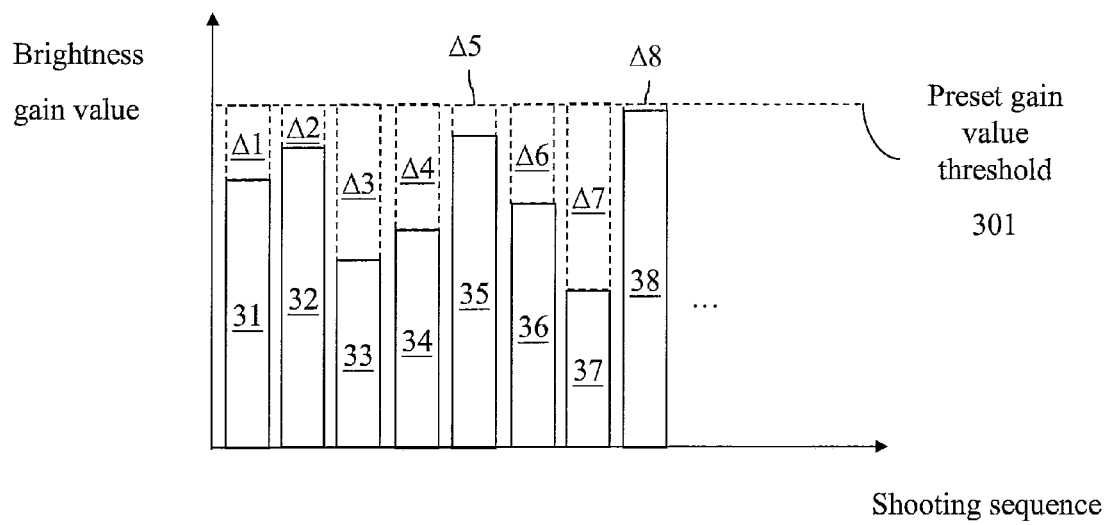
FIG. 3A is a schematic view of brightness gain values of a raw image.
Figure 3B:
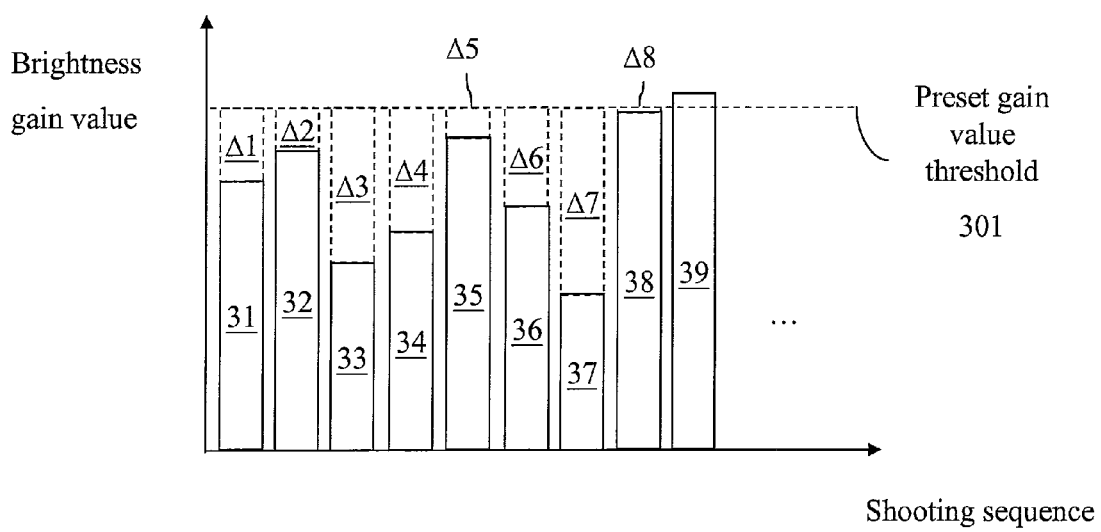
FIG. 3B is a schematic view of brightness gain values of another raw image.

In order to clearly define the relationship between the brightness gain value of the raw image and the adjusted brightness gain value, an example is given in FIGS. 3A and 3B. FIG. 3A is a schematic view of brightness gain values of a raw image. A brightness gain value 31 to a brightness gain value 38 of a raw image are brightness gain values of the raw image calculated according to the raw image shot under the same scene and brightness each time. Δ1 to Δ8 are differences between the brightness gain value 31 to the brightness gain value 38 of the raw image and the preset gain threshold value 301.

Taking a brightness gain value 33 of the raw image as an example, the process for calculating the brightness gain value for compensating the raw image is to amplify the brightness gain value 33 of the raw image by multiples to the preset gain threshold value 301, in which the brightness gain value for compensating the raw image is the value obtained by dividing the preset gain threshold value 301 by the brightness gain value 33. Alternatively, the process for calculating the brightness gain value for compensating the raw image is to compensate the brightness gain value 33 of the raw image to the preset gain threshold value 301, in which the brightness gain value for compensating the raw image is obtained by an equal difference computation, that is a computation of a difference Δ3 between the preset gain threshold value 301 and the brightness gain value 33 of the raw image.

Furthermore, in the case of an exceptional circumstance that the brightness gain value of the raw image is larger than the preset gain threshold value 301, other processes for calculating the brightness gain value for compensating the raw image should be considered. FIG. 3B is a schematic view of brightness gain values of another raw image. When the brightness gain value 39 of the raw image is larger than the preset gain threshold value 301, the preset gain threshold value 301 is replaced by the brightness gain value 39 of the raw image. Afterwards, an image processing is directly performed without adjusting the brightness gain value 39 and color gain value of the raw image. Alternatively, the brightness gain value of the raw image to be decreased is calculated according to the preset gain threshold value 301, so as to maintain the brightness gain value of the shot image at the preset gain threshold value 301.

What is claimed is:

1. An image brightness correction method, for correcting a brightness gain of a shot image to a uniform level after a camera device shoots the image with a flash lamp turned on, the method comprising: the camera device firing a pre-flash and shooting an image according to the pre-flash; capturing an automatic exposure time of the camera device, and estimating a main flash duration according to the image and the automatic exposure time of the camera device; firing a main flash according to the main flash duration, and shooting a raw image; calculating a brightness gain value of the raw image, and calculating an inadequate brightness gain ratio of the raw image according to a preset gain threshold value; and according to the inadequate brightness gain ratio of the raw image, recalculating a color gain value of the raw image, and outputting the compensated color gain value as a preset image file wherein the inadequate brightness gain ratio of the raw image is denoted by a following mathematical expression: the inadequate brightness gain ratio of the raw image=the preset gain threshold value/the brightness gain value of the raw image.

2. The image brightness correction method according to claim 1, wherein the preset gain threshold value is a maximum brightness gain selected from a plurality of groups of images photographed according to the pre-flash.

3. The image brightness correction method according to claim 1, wherein the color gain value of the raw image is compensated through an interpolation procedure according to the inadequate brightness gain ratio of the raw image.

4. The image brightness correction method according to claim 3, wherein the interpolation procedure is to perform an equal difference computation on the brightness gain value for compensating the raw image.

5. The image brightness correction method according to claim 1, wherein if the brightness gain value of the raw image is larger than the preset gain threshold value, the preset gain threshold value is replaced by the brightness gain value of the raw image.

* * * * *